US008794119B2

(12) United States Patent
Shulman et al.

(10) Patent No.: US 8,794,119 B2
(45) Date of Patent: Aug. 5, 2014

(54) SYSTEM AND METHOD FOR REGISTRATION OF ARTILLERY FIRE (75) Inventors: Dan Shlomo Shulman, Zichron Yaakov (IL); Yair Bnayahu, Camon (IL); Egon Gersch, Kiriat Bialik (IL); Shlomo Cohen, Kiriat Bialik (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 55 days.

(21) Appl. No.: 13/582,426

(22) PCT Filed: Mar. 13, 2011

(86) PCT No.: PCT/IB2011/051050
§ 371 (c)(1),
(2), (4) Date: Sep. 2, 2012

(87) PCT Pub. No.: WO2011/114277
PCT Pub. Date: Sep. 22, 2011

(65) Prior Publication Data
US 2012/0325078 A1 Dec. 27, 2012

(51) Int. Cl.
*F41G 3/14* (2006.01)
(52) U.S. Cl.
USPC ........................... 89/41.06; 89/41.01
(58) Field of Classification Search
CPC ........... F41G 3/14; F41G 3/142; F41G 3/145; F41G 3/147; F41G 3/16; F41G 3/165; F41G 3/18; F41G 3/20
USPC .................... 89/41.01, 41.06, 41.05
See application file for complete search history.

(56) References Cited

U.S. PATENT DOCUMENTS

| 3,757,632 | A | * | 9/1973 | Bellinger | 89/1.1 |
| 3,997,762 | A | * | 12/1976 | Ritchie et al. | 235/404 |
| 4,202,246 | A | | 5/1980 | Ritter et al. | |
| 4,266,463 | A | * | 5/1981 | Saltin | 89/41.22 |
| 4,579,035 | A | * | 4/1986 | Whiting | 89/41.05 |
| 5,208,418 | A | * | 5/1993 | Toth et al. | 89/41.07 |

(Continued)

FOREIGN PATENT DOCUMENTS

| CA | 2023659 | | 7/1990 |
| CH | 501203 | * | 8/1970 |
| EP | 0261091 | | 3/1998 |
| GB | WO9814747 | | 4/1998 |

OTHER PUBLICATIONS

Tactical and Technical "Trends in Artillery for Instruction" United states army artillery and missile School fort sill, Oklahoma, Feb. 1958, pp. 1-45.

*Primary Examiner* — Timothy D Collins
*Assistant Examiner* — Joshua Freeman
(74) *Attorney, Agent, or Firm* — Mark M. Friedman (57) ABSTRACT A system and method for providing information for performing a registration correction for artillery employs two spaced apart optical imaging systems associated with a processing system. Outputs from the two imaging systems are monitored to detect potential shell trajectory events and then correlated to eliminate potential shell trajectory events not viewed by both optical imaging systems. Locations are determined for potential shell trajectory events viewed by both optical imaging systems. Shell firing data relating to firing of at least one shell is provided to determine at least one predicted trajectory time point for the shell, and this is used to identify a corresponding detected shell trajectory event. The time and location of the detected shell trajectory event can then be used in determining a registration correction for the artillery

21 Claims, 5 Drawing Sheets

(56) References Cited

U.S. PATENT DOCUMENTS

| | | | |
|---|---|---|---|
| 5,285,273 A * | 2/1994 | James et al. | 348/169 |
| 6,125,308 A | 9/2000 | Hills et al. | |
| 6,260,466 B1 * | 7/2001 | Humphreys | 89/41.06 |
| 8,074,555 B1 * | 12/2011 | Sullivan et al. | 89/41.17 |
| 2005/0262993 A1 * | 12/2005 | Nurse | 89/1.11 |
| 2007/0002304 A1 | 1/2007 | Saltsman | |

* cited by examiner

SYSTEM AND METHOD FOR REGISTRATION OF ARTILLERY FIRE

FIELD AND BACKGROUND OF THE INVENTION

The present invention relates to systems and methods for registration of artillery fire.

It is common known to perform target registration for artillery fire in order to correct for off-target aiming errors such as are due to environmental variables. This process is particularly needed for beyond visible targets (e.g., behind a hill or in a valley) where an intuitive hit-and-miss approach is not feasible.

The common procedure for target registration requires a human observer in a lookout position able to see the target region, equipped with a rangefinder, GPS and north-finding system (e.g. a compass). The registration process is an iterative one in which the observer observes the impact of a number of shells, typically 3-6 shells, each time identifying the location (geographical coordinates) of the impact and reporting to the artillery controller. A mean point of impact (MPI) is then determined, which is used together with the intended target location to determine a correction which can be used for subsequent shells aimed at the same target or other targets in the same target region.

This process is problematic for a number of reasons. Firstly, it is dependent on having a person with suitable equipment deployed in direct view of the targets, which may not be feasible or which may unnecessarily endanger personnel. Secondly, it requires close cooperation and intensive communication between the artillery operator and the observer, rendering the process labor intensive and slow. Thirdly, this approach cannot readily be used where multiple artillery pieces are firing against a common target due to the likely ambiguity between different shells fired around the same time.

There is therefore a need for an alternative system and method for performing artillery target registration.

SUMMARY OF THE INVENTION

The present invention is a system and method for performing registration of artillery fire.

According to an embodiment of the present invention there is provided, a shell monitoring system for providing information for performing a registration correction for artillery, the system comprising: (a) a first optical imaging system deployed at a first location; (b) a second optical imaging system deployed at a second location, spaced apart from the first location; and (c) a processing system in data communication with the first and second optical imaging systems, the processing system being configured to: (i) monitor outputs from the first and second imaging systems to detect potential shell trajectory events viewed by the imaging systems; (ii) correlate the potential shell trajectory events to eliminate potential shell trajectory events not viewed by both of the optical imaging systems and to determine locations for potential shell trajectory events viewed by both of the optical imaging systems; (iii) receive shell firing data relating to firing of at least one shell, the shell firing data being sufficient to determine at least one predicted trajectory time point for the shell; (iv) identify one of the potential shell trajectory events as a detected shell trajectory event corresponding to the predicted trajectory time point; and (v) retrieve the time and location of the detected shell trajectory event for use in determining a registration correction for the artillery.

According to a further feature of an embodiment of the present invention, the processing system is configured to monitor outputs from the first and second imaging systems to detect potential shell trajectory events corresponding to airborne explosion of an artillery shell.

According to a further feature of an embodiment of the present invention, the processing system is further configured, after detecting of a potential shell trajectory event, to process a number of frames from the first and second imaging systems sampled immediately prior to the potential shell trajectory event to identify additional potential shell trajectory events corresponding to locations along a trajectory of the shell prior to the airborne explosion.

According to a further feature of an embodiment of the present invention, the processing system is configured to monitor outputs from the first and second imaging systems to detect potential shell trajectory events corresponding to the flight of a base-bleed shell.

According to a further feature of an embodiment of the present invention, the first and second optical imaging systems are staring infrared imaging sensors.

According to a further feature of an embodiment of the present invention, the processing system is configured to receive the shell firing data from each of a plurality of artillery batteries, and to retrieve the time and location of the detected shell trajectory event for use in determining a registration correction for each of the artillery batteries.

According to a further feature of an embodiment of the present invention, the first optical imaging system is mounted on a region of a first artillery piece and the second optical imaging system is mounted on a region of a second artillery piece.

There is also provided, according to an embodiment of the present invention, a method for providing information for performing a registration correction for artillery, the method comprising the steps of: (a) providing a shell monitoring system comprising: (i) a first optical imaging system deployed at a first location, and (ii) a second optical imaging system deployed at a second location, spaced apart from the first location; (b) monitoring outputs from the first and second imaging systems to detect potential shell trajectory events viewed by the imaging systems; (c) correlating the potential shell trajectory events to eliminate potential shell trajectory events not viewed by both of the optical imaging systems and to determine locations for potential shell trajectory events viewed by both of the optical imaging systems;

(d) receiving shell firing data relating to firing of at least one shell, the shell fixing data being sufficient to determine at least one predicted trajectory time point for the shell; (e) identifying one of the potential shell trajectory events as a detected shell trajectory event corresponding to the predicted trajectory time point; and (f) retrieving the time and location of the detected shell trajectory event for use in determining a registration correction for the artillery.

According to a further feature of an embodiment of the present invention, the monitoring is performed so as to detect potential shell trajectory events corresponding to airborne explosion of an artillery shell. According to a further feature of an embodiment of the present invention, after detecting of a potential shell trajectory event, a number of frames from the first and second imaging systems sampled immediately prior to the potential shell trajectory event are processed to identify additional potential shell trajectory events corresponding to locations along a trajectory of the shell prior to the airborne explosion.

According to a further feature of an embodiment of the present invention, the monitoring is performed so as to detect potential shell trajectory events corresponding to the flight of a base-bleed shell.

According to a further feature of an embodiment of the present invention, the first and second optical imaging systems are staring infrared imaging sensors.

According to a further feature of an embodiment of the present invention, the shell firing data is received from each of a plurality of artillery batteries, and wherein the time and location of the detected shell trajectory event is retrieved for use in determining a registration correction for each of the artillery batteries.

According to a further feature of an embodiment of the present invention, the first optical imaging system is mounted on a region of a first artillery piece and the second optical imaging system is mounted on a region of a second artillery piece.

There is also provided according to an embodiment of the present invention, a method for performing registration of an artillery piece, the method comprising the steps of: (a) providing a communication link to a shell monitoring system including an array of spaced apart optical imaging systems, the shell monitoring system being configured to detect and generate a database of potential shell trajectory events, each shell trajectory event having a location and time; (b) firing a shell; (c) sending a request to the shell monitoring system via the communication link, the request including shell firing data sufficient to determine at least one predicted trajectory time point; (d) receiving from the shell monitoring system information derived at least in part from the location and time of an entry in the database of potential shell trajectory events corresponding to the predicted trajectory time point; and (e) performing a registration correction based at least in part on the information.

According to a further feature of an embodiment of the present invention, the firing a shell is performed such that the shell explodes in the air.

According to a further feature of an embodiment of the present invention, a sequence of shells is fired in such a manner that they explode at different points along a current trajectory, thereby allowing determination of the trajectory.

According to a further feature of an embodiment of the present invention, the firing a shell is performed with a base-bleed shell.

According to a further feature of an embodiment of the present invention, the steps of firing a shell and sending a request are performed during firing of multiple artillery pieces towards a common target. According to a further feature of an embodiment of the present invention, the steps of firing a shell and sending a request are performed during a sequence of shells fired to effect damage to a target.

According to a further feature of an embodiment of the present invention, the steps of firing a shell and sending a request are repeated for shells fired towards at least two spaced apart target regions, thereby allowing determination of a registration correction for each of the target regions.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a system and method for performing registration of artillery fire.

The principles and operation of systems and methods according to the present invention may be better understood with reference to the drawings and the accompanying description.

Figure 1:
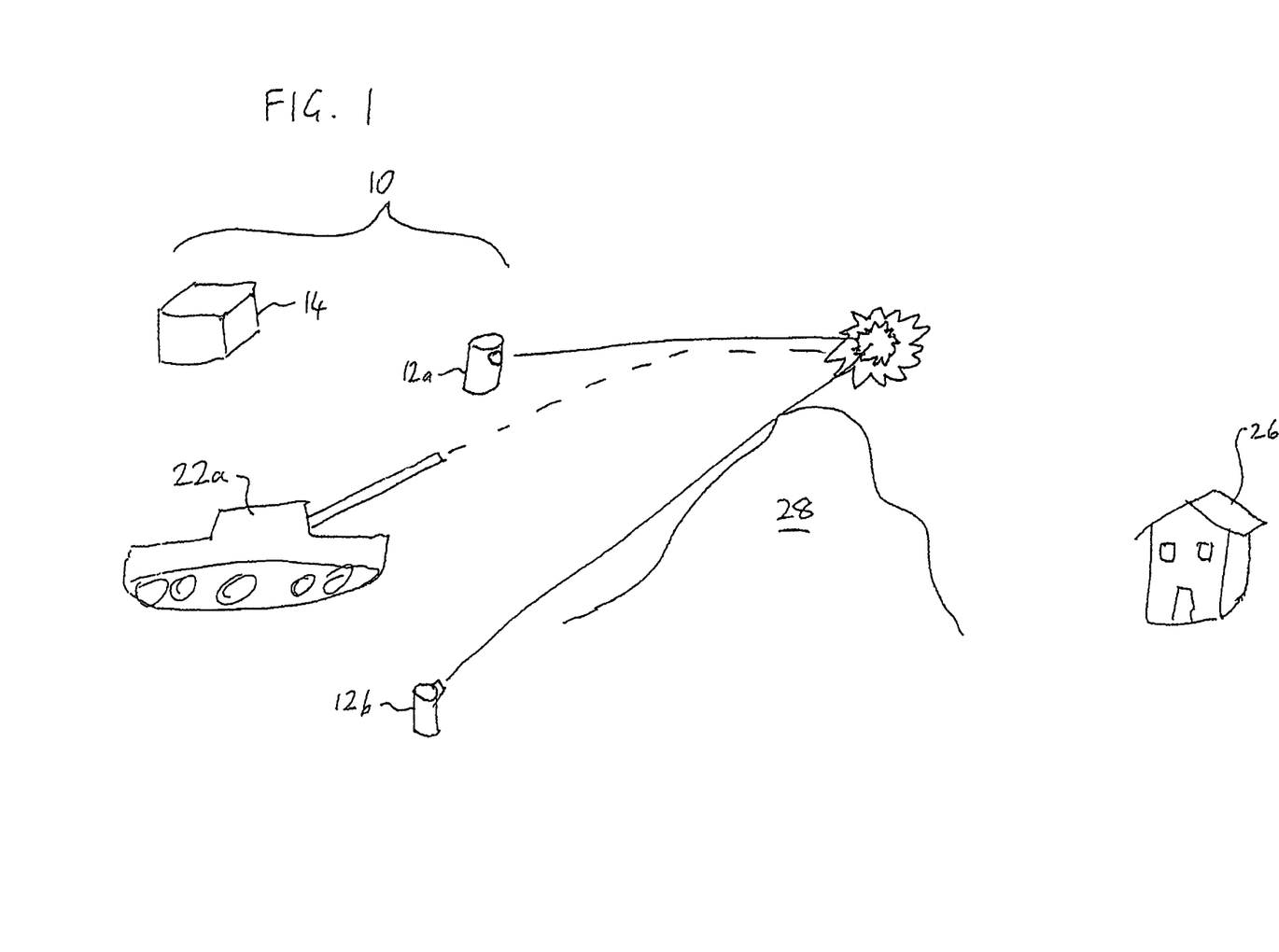
FIG. 1 is a schematic representation of the operation of a system for performing registration of artillery fire according to an embodiment of the present invention.
Figure 2:
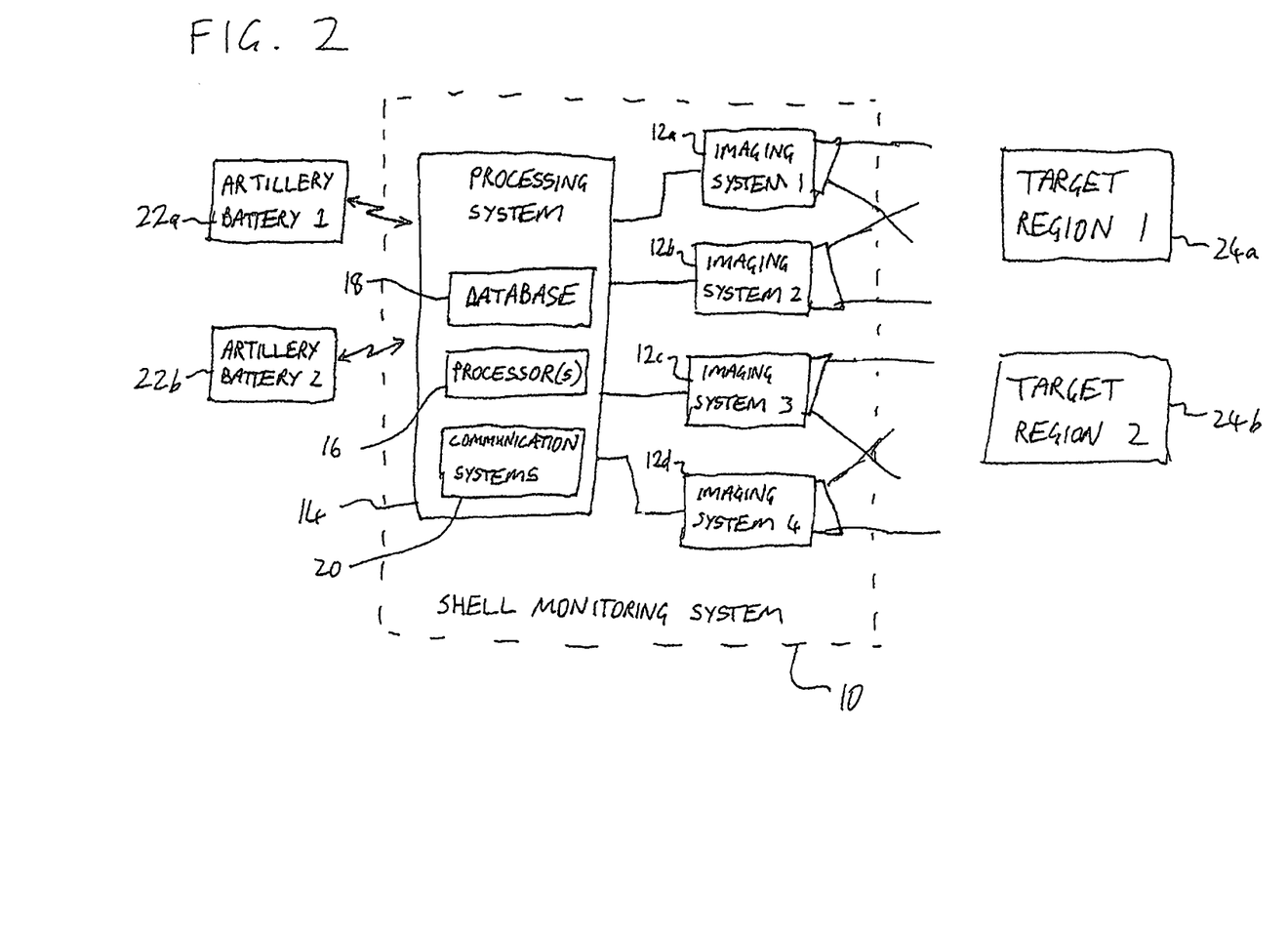
FIG. 2 is a block diagram of the system of FIG. 1.

Referring now to the drawings, FIGS. 1 and 2 show schematically a shell monitoring system, generally designated 10, constructed and operative according to an embodiment of the present invention, for providing information for performing a registration correction for artillery. Generally speaking, shell monitoring system 10 includes a first optical imaging system 12a deployed at a first location and a second optical imaging system 12b deployed at a second location, spaced apart from the first location. Optionally, additional optical imaging systems such as those shown in FIG. 2 as 12c and 12d may be provided. A processing system 14 is in data communication with the optical imaging systems. Processing system 14 preferably includes at least one processor 16, at least one data storage device for storing a database 18 and communication systems 20 for providing wired or wireless data communication with the imaging systems and with artillery batteries 22a and 22b.

Figure 5:
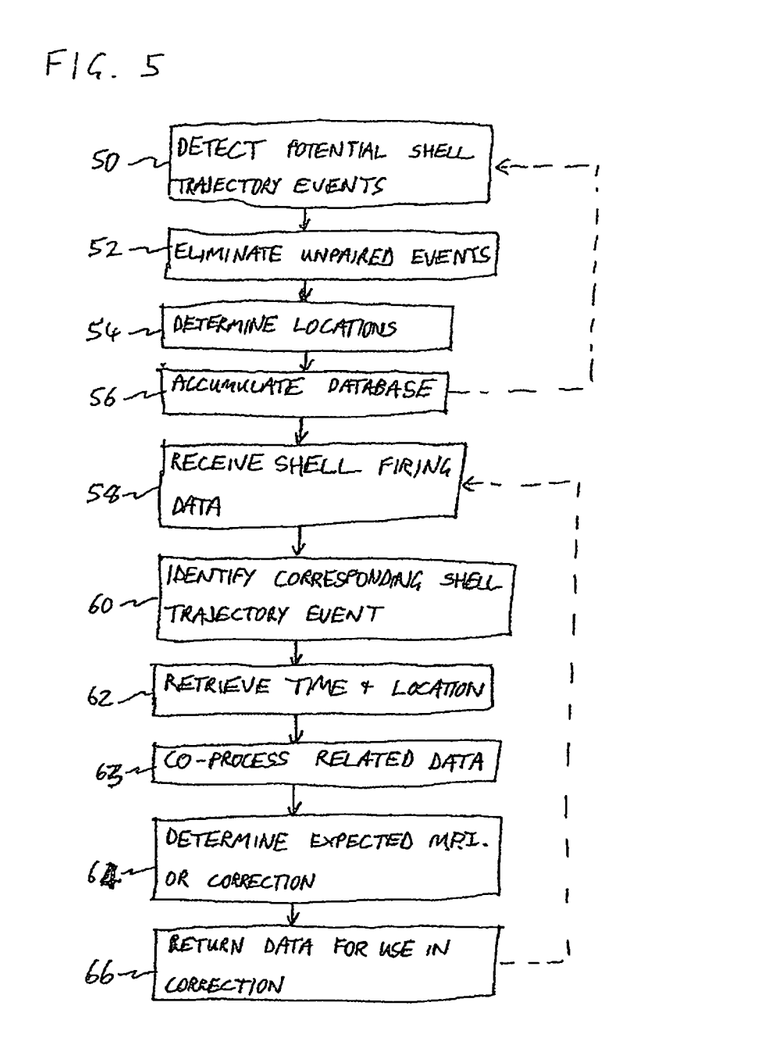
FIG. 5 is a flow diagram illustrating a mode of operation of the system of FIG. 1, corresponding to a method according to an embodiment of the present invention.

An example of the operation of shell monitoring system 10, corresponding to a particularly preferred embodiment of a method according to the present invention, will be best understood with reference to FIG. 5. The processing system 14 monitors outputs from the imaging systems 12a, 12b etc. to detect potential shell trajectory events viewed by the imaging systems (step 50). The potential shell trajectory events may be identified according to various different filtering algorithms designed to detect optical events of one or more predefined types which the system is intended to detect. These may include one or more of: explosion of a shell on the ground; aerial explosion of a shell; and the path of a shell with a base-bleed. In certain cases, depending on the sensitivity, type and resolution of the imaging systems, the "event" may be part or all of the path of a shell, even without a base-bleed. The events are preferably identified automatically by image processing techniques which may include checking for temporal signatures, spectral signatures, and a range of other rules appropriate to each given type of event.

The potential shell trajectory events are correlated to eliminate potential shell trajectory events not viewed by at least two of the optical imaging systems or otherwise incompatible with the expected behavior of a shell (step 52). Where correlation is found for a potential shell trajectory event between at least two of the optical imaging systems, triangulation is used to determine the location for each potential shell trajectory events viewed by at least (step 54). Where the "event" is an elongated path, this may be defined as a sequence of (time, location) data pairs making up the path. Preferably, the correlated potential shell trajectory events, together with their time, position and preferably other details about the nature of the event are stored in a database (step 56).

Most preferable, steps 50 through 56 are repeated continuously to provide a continuously updated database of potential shell trajectory events, to be searched in the course of retroactive data queries, as will be described below.

When the operator of an artillery piece or battery wishes to perform a registration correction, the operator fires a shell, and sends a request to the shell monitoring system including shell firing data sufficient to determine at least one predicted trajectory time point. In a simple implementation, the shell firing data may be simply the coordinates of the target location and an approximate time of firing, giving a general indication of the likely time and position of the predicted trajectory time point. More preferably, the shell firing data includes the firing location, firing direction (elevation and azimuth), and various details about the shell, such as the estimated or measured (Doppler) muzzle velocity and any other data relevant for determining the trajectory of the shell. Optionally, the data may be derived from a standard model, such as according to NATO STANAG 4355 for a Modified Point Mass Trajectory simulation. Where a specialized shell is used, such as a timed fuze shell, details of the type and parameters (e.g., fuze time) are preferably also included in the request. The shell firing data is preferably chosen to be sufficient to determine at least one predicted trajectory time point for the shell, whether for an aerial explosion, ground impact, or time points along the shell's trajectory in the case of full trajectory tracking.

At step 58, the shell monitoring system receives the shell firing data relating to firing of at least one shell. The system then searches in the database to identify one of the potential shell trajectory events as a detected shell trajectory event corresponding to the predicted trajectory time point (step 60) and retrieves the time and location of the detected shell trajectory event (step 62) for use in determining a registration correction for the artillery.

In some implementations, further processing of the retrieved data together with the query data is performed by the shell monitoring system in order to provide information in a more useful form to the artillery battery. For example, where a number of shells have been fired with the same firing position and direction, the various retrieved data may be co-processed (step 63) to determine an overall expected mean point of impact (MPI) or to directly determine the required aiming correction (step 64), and the information returned to the artillery battery (step 66). Alternatively, the retrieved time and location data may be returned to the artillery battery in step 66 in its raw form for subsequent processing and derivation of the required correction using equipment associated with the artillery battery. In either case, the returned information is then used by the artillery unit, either manually or automatically, to implement a registration correction based at least in part on the information.

Most preferably, steps 58 through 66 are performed repeatedly on demand, acting as an artillery registration data server which may support multiple artillery batteries in different locations. Similarly, shell monitoring system 10 may support each artillery battery performing separate registration correction for two or more target regions 24a and 24b (FIG. 2). In the latter case, each target region may be provided with its own set of at least two imaging systems (12a, 12b) and (12c, 12d), respectively.

It should be noted that the present invention is applicable to a wide range of weapons referred to generically herein as "artillery" which fire shells along ballistic paths. Examples include, but are not limited to, tank-mounted guns or cannons, field artillery guns or cannons of all types, and ship-mounted guns or cannons.

Although described herein in a particularly preferred architecture in which shell monitoring system 10 is a self-contained server providing responses to retroactive queries provided after firing of a shell, it should be noted that other possible implementations also fall within the general scope of the present invention. For example, an alternative implementation employs a request sent prior to firing of a shell, and causes the system to monitor a corresponding predicted time window and region for an event corresponding to the predicted trajectory time point(s). Similarly, the present invention is not limited to implementations as a stand-alone system distinct from the artillery batteries; one or more components of the shell monitoring system may optionally be integrated with other artillery equipment or installations, and the various functions of processing system 14 may optionally be performed by existing processing systems of the artillery equipment.

Optical imaging systems 12a, 12b etc. may be any suitable type of imaging system operating in any suitable spectral range or combination of ranges, whether in the visible, ultraviolet or infrared ranges. Particularly preferred examples include CCD or CMOS sensors operating in visible or near IR ranges, and staring infrared imaging (FLIR) sensors operating in medium (thermal) IR ranges. In certain cases, the imaging systems may be multi-purpose imaging systems provided for at least one additional function, and may be pre-existing devices which are used to provide additional functionality according to the teachings of the present invention. For example, in the case of a naval ship-based implementation, the imaging systems may be implemented using an existing infrared search-and-track (IRST) system, where available, mounted on two spaced-apart ships. The geometry of the imaging systems is calibrated prior to use such that the location of an image feature in each image can be uniquely associated with a spatial direction from the imaging system. By correlating features viewed by at least two imaging systems, triangulation can be performed to derive the location of an event in space.

Shell monitoring system 10 is preferably configured to be used in a plurality of different modes, depending upon each particular scenario. In a simple case where the imaging systems have a direct view of the target region, the system can monitor ground impact explosion of a number of shells, providing a server-based replacement for the conventional registration correction procedure as described above.

In a case such as is illustrated in FIG. 1, where the target 26 is out of visual contact, such as due to intervening hills 28 or other obscuring geographical features, one particularly advantageous approach is the use of a shell configured for aerial explosion, typically either by use of a timed fuze or by an altitude fuze. The aerial explosion allows the imaging systems to derive the location of the shell at a point along its trajectory before it disappears from view.

Where sufficiently precise timing information is available to determine the time of flight from firing to the trajectory location point, each location point may be sufficient to determine the actual trajectory and extrapolate, typically in combination with a digital terrain map, to determine a predicted point of impact and angle of attack at the target. In this case, a number of shells may be fired with the same time or altitude fuze setting, and each measurement used to determine a corresponding predicted point of impact. The MPI and corresponding required correction can then be calculated in the conventional manner.

Figure 3A:
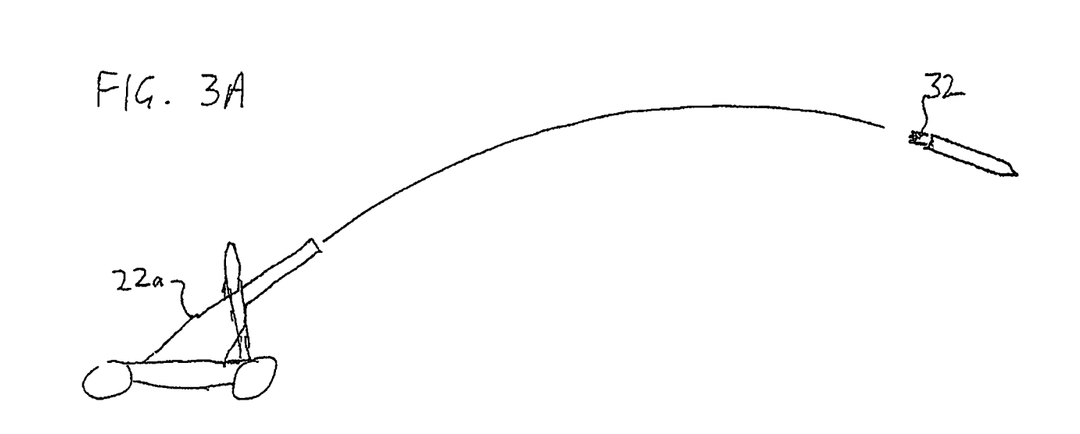
FIGS. 3A and 3B are schematic representations of two preferred modes of operation of the system of FIG. 1.
Figure 3B:
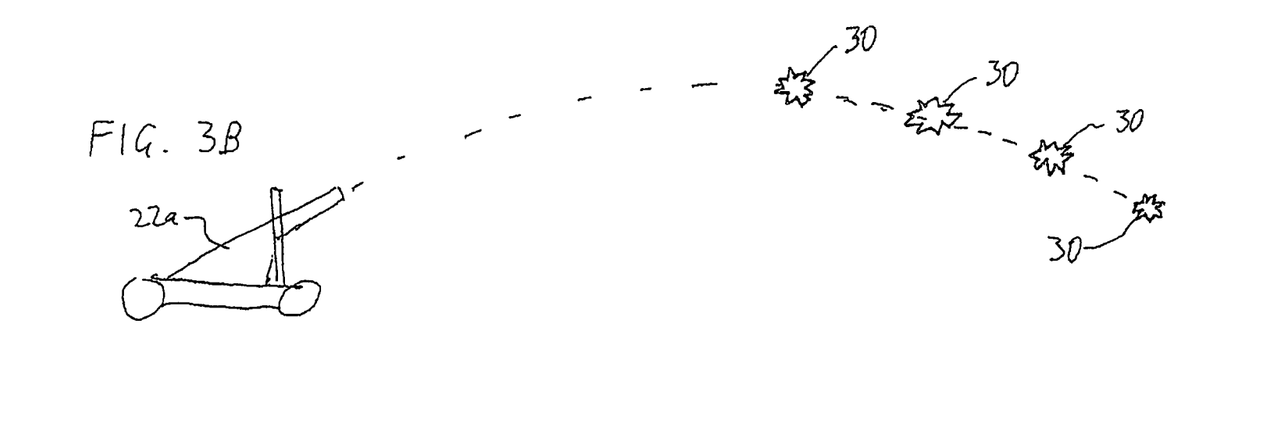

In some cases, particularly where precisely synchronized timing information is not available, it may be preferable to adopt an alternative approach illustrated schematically in FIG. 3B. In this case, a sequence of shells are fired with their fuzes timed (or altitudes set) to explode at different points 30 along the trajectory. The plurality of reference points spaced along the trajectory allows accurate determination of the trajectory and extrapolation to find the predicted point of impact. This approach also provides clear information regarding the angle of attack.

FIG. 3A illustrates an alternative approach according to which a shell with a base bleed 32 is used. The base bleed provides a thermal signature readily visible in the IR range, allowing determination of multiple points (or continuous tracking) along the trajectory, and thereby determination of the trajectory, the estimated point of impact and the angle of attack.

According to a further aspect of a particular preferred embodiment, initial sensing of a trajectory event may be performed using a sufficiently high threshold for the shell monitoring system that it only detects explosions and avoids other "false alarm" radiation sources. Only after sensing of an explosion, the system may perform a hypothesis-driven retroactive search through a number of frames prior to the explosion to try to identify the shell in those frames at points along its trajectory prior to detonation. Since the search is hypothesis based, employing back-extrapolation from the definitively detected explosion to search specific frames in specific regions, additional data of points along the trajectory may be detected with high sensitivity (low threshold) processing without risk of false alarms. This may allow effective determination of the shell trajectory using fewer shells than would otherwise be possible.

In order to determine the location of a trajectory event from imaging systems 12a, 12b etc., the locations and orientations of the imaging systems must be precisely known. In certain cases, the imaging systems may be located in fixed and previously calibrated locations. In many cases, mobile imaging systems are required. In this case, precise location is typically achieved by a combination of conventional equipment including a GPS device and a north-finding system.

Figure 4:
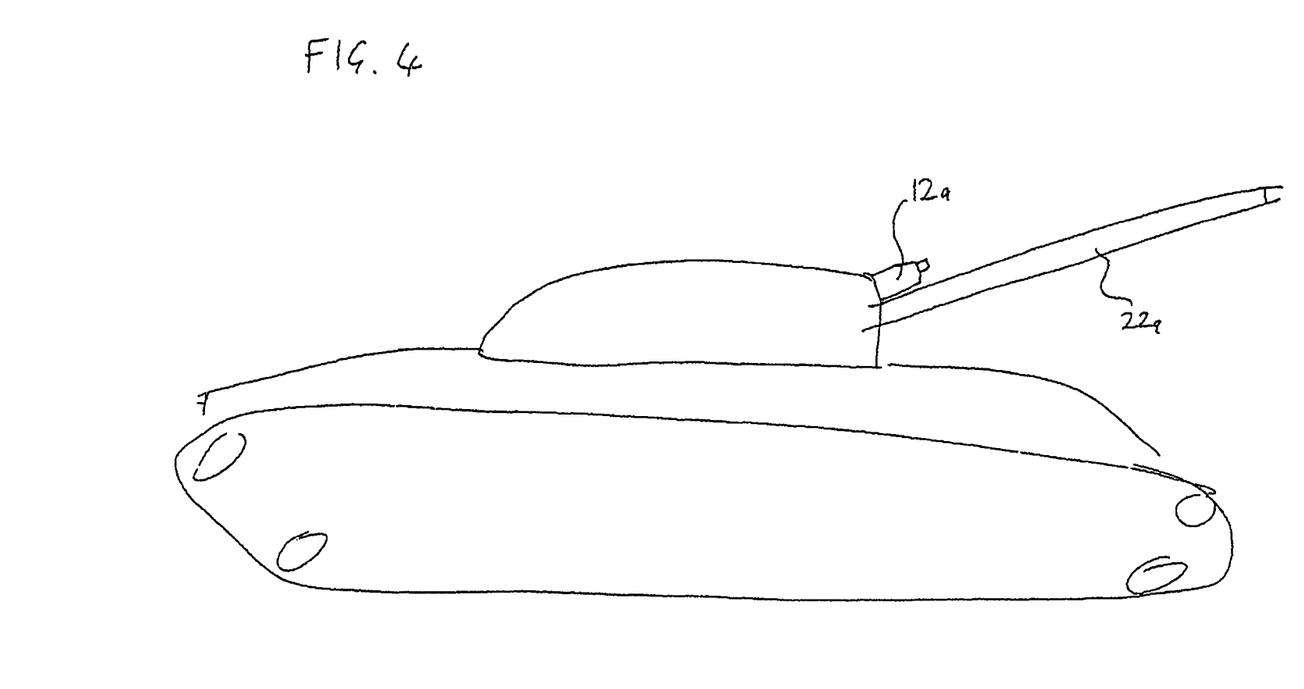
FIG. 4 is a schematic illustration of a possible mounting position for an optical imaging system according to an embodiment of the present invention.

In certain cases, correct and well defined position and orientation of the imaging systems may be achieved by associating the imaging systems with other equipment provided with suitable sensors. By way of one particularly advantageous exemplary embodiment, FIG. 4 illustrates schematically an implementation in which each optical imaging system 12a is mounted on a region of a corresponding artillery piece 22a, in this case, the turret of a tank. In addition to providing well defined position and orientation, this option also inherently ensures that the imaging system is oriented with its field of view appropriately positioned with its viewing direction towards the current target region. By employing imaging systems mounted on two spaced-apart artillery pieces, the functionality of the system described herein may be provided to these and many other artillery pieces which are in the vicinity of these artillery pieces and are targeting the same or nearby target regions.

It should be noted that, in addition to greatly speeding up the registration process, shell monitoring system 10 provides functionality which cannot be achieved by conventional manual registration techniques. Specifically, the ability to monitor multiple events and then identify which one corresponds to each specific set of shell firing data according to a specific predicted time and location window allows registration correction to be performed for multiple artillery batteries simultaneously with very little risk of causing ambiguity. Even if ambiguity were to occur, the ambiguity would readily be detected by the system, allowing any unreliable measurements to be discarded. Similarly, the system allows performance of on-the-fly registration correction or reconfirmation during live fire simply by including one or more time-fuze shells in the firing sequence and sending corresponding requests to the shell monitoring system, without interrupting the bombardment of the target by other artillery pieces. The system and method similarly allows individual registration correction for each individual artillery piece by inclusion of one or more timed-fuze shell during live bombardment of a target, thereby reducing the average registration error of the artillery battery, and potentially reducing the total number of shells required to achieve a given desired effect.

It will be appreciated that the above descriptions are intended only to serve as examples, and that many other embodiments are possible within the scope of the present invention as defined in the appended claims.

What is claimed is:

1. A shell monitoring system for providing information for performing a registration correction for artillery, the system comprising:
   (a) a first optical imaging system deployed at a first location;
   (b) a second optical imaging system deployed at a second location, spaced apart from said first location; and
   (c) a processing system in data communication with said first and second optical imaging systems, said processing system being configured to:
      (i) monitor outputs from said first and second imaging systems to detect potential shell trajectory events viewed by said imaging systems;
      (ii) correlate said potential shell trajectory events to eliminate potential shell trajectory events not viewed by both of said optical imaging systems and to determine locations for potential shell trajectory events viewed by both of said optical imaging systems;
      (iii) receive shell firing data relating to firing of at least one shell, said shell firing data being sufficient to determine at least one predicted trajectory time point for the shell;
      (iv) identify one of said potential shell trajectory events as a detected shell trajectory event corresponding to the predicted trajectory time point; and
      (v) retrieve the time and location of said detected shell trajectory event for use in determining a registration correction for the artillery.

2. The system of claim 1, wherein said processing system is configured to monitor outputs from said first and second imaging systems to detect potential shell trajectory events corresponding to airborne explosion of an artillery shell.

3. The system of claim 2, wherein said processing system is further configured, after detecting of a potential shell trajectory event, to process a number of frames from said first and second imaging systems sampled immediately prior to said potential shell trajectory event to identify additional potential shell trajectory events corresponding to locations along a trajectory of the shell prior to said airborne explosion.

4. The system of claim 1, wherein said processing system is configured to monitor outputs from said first and second imaging systems to detect potential shell trajectory events corresponding to the flight of a base-bleed shell.

5. The system of claim 1, wherein said first and second optical imaging systems are staring infrared imaging sensors.

6. The system of claim 1, wherein said processing system is configured to receive said shell firing data from each of a plurality of artillery batteries, and to retrieve the time and location of said detected shell trajectory event for use in determining a registration correction for each of said artillery batteries.

7. The system of claim 1, wherein said first optical imaging system is mounted on a region of a first artillery piece and said second optical imaging system is mounted on a region of a second artillery piece.

8. A method for providing information for performing a registration correction for artillery, the method comprising the steps of;
   (a) providing a shell monitoring system comprising:
      (i) a first optical imaging system deployed at a first location, and
      (ii) a second optical imaging system deployed at a second location, spaced apart from said first location;
   (b) monitoring outputs from said first and second imaging systems to detect potential shell trajectory events viewed by said imaging systems;
   (c) correlating said potential shell trajectory events to eliminate potential shell trajectory events not viewed by both of said optical imaging systems and to determine locations for potential shell trajectory events viewed by both of said optical imaging systems;
   (d) receiving shell firing data relating to firing of at least one shell, said shell firing data being sufficient to determine at least one predicted trajectory time point for the shell;
   (e) identifying one of said potential shell trajectory events as a detected shell trajectory event corresponding to the predicted trajectory time point; and
   (f) retrieving the time and location of said detected shell trajectory event for use in determining a registration correction for the artillery.

9. The method of claim 8, wherein said monitoring is performed so as to detect potential shell trajectory events corresponding to airborne explosion of an artillery shell.

10. The method of claim 9, further comprising, after detecting of a potential shell trajectory event, processing a number of frames from said first and second imaging systems sampled immediately prior to said potential shell trajectory event to identify additional potential shell trajectory events corresponding to locations along a trajectory of the shell prior to said airborne explosion.

11. The method of claim 8, wherein said monitoring is performed so as to detect potential shell trajectory events corresponding to the flight of a base-bleed shell.

12. The method of claim 8, wherein said first and second optical imaging systems are staring infrared imaging sensors.

13. The method of claim 8, wherein said shell firing data is received from each of a plurality of artillery batteries, and wherein the time and location of said detected shell trajectory event is retrieved for use in determining a registration correction for each of said artillery batteries.

14. The method of claim 8, wherein said first optical imaging system is mounted on a region of a first artillery piece and said second optical imaging system is mounted on a region of a second artillery piece.

15. A method for performing registration of an artillery piece, the method comprising the steps of:
   (a) providing a communication link to a shell monitoring system including an array of spaced apart optical imaging systems, the shell monitoring system being configured to detect and generate a database of potential shell trajectory events, each shell trajectory event having a location and time;
   (b) firing a shell;
   (c) sending a request to the shell monitoring system via the communication link, said request including shell firing data sufficient to determine at least one predicted trajectory time point;
   (d) receiving from the shell monitoring system information derived at least in part from the location and time of an entry in the database of potential shell trajectory events corresponding to said predicted trajectory time point; and
   (e) performing a registration correction based at least in part on said information.

16. The method of claim 15, wherein said firing a shell is performed such that the shell explodes in the air.

17. The method of claim 16, further comprising firing a sequence of shells in such a manner that they explode at different points along a current trajectory, thereby allowing determination of tine trajectory.

18. The method of claim 15, wherein said firing a shell is performed with a base-bleed shell.

19. The method of claim 15, wherein said steps of firing a shell and sending a request are performed during firing of multiple artillery pieces towards a common target.

20. The method of claim 15, wherein said steps of firing a shell and sending a request are performed during a sequence of shells fired to effect damage to a target.

21. The method of claim 15, wherein said steps of firing a shell and sending a request are repeated for shells fired towards at least two spaced apart target regions, thereby allowing determination of a registration correction for each of said target regions.

* * * * *